Patented May 14, 1935

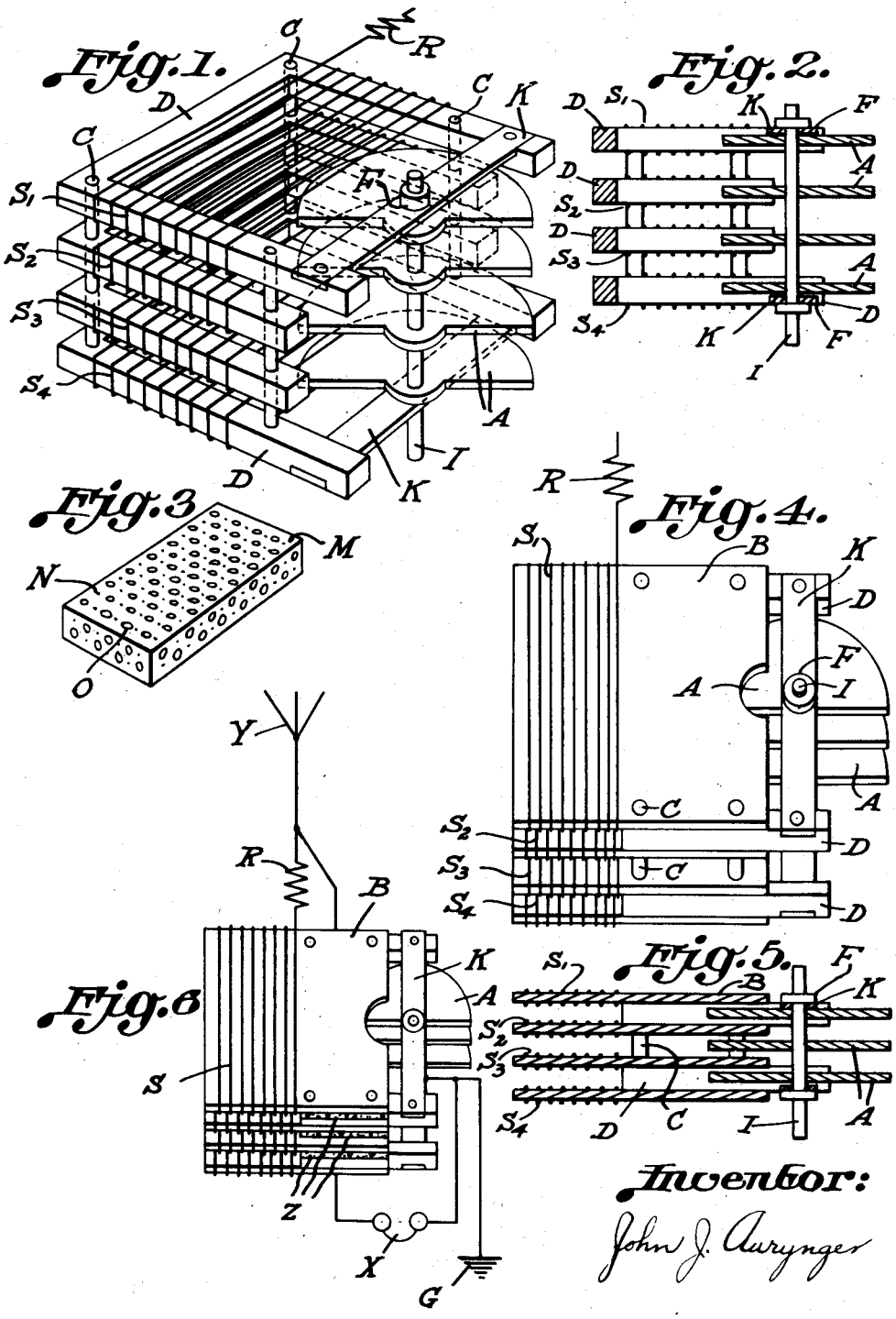

2,001,235

UNITED STATES PATENT OFFICE 2,001,235

DEVICE FOR UNIFYING INDUCTANCES, CAPACITIES, AND RESISTANCES

John J. Aurynger, Takoma Park, Md.

Application December 11, 1933, Serial No. 701,935

6 Claims. (Cl. 250—16)

In this invention the inductance and the inductance cores are not divided; whether the core is air or a metal plate, only one element is formed. The insertion of the core as a part of condenser elements permits inductances to operate independently as inductances.

Capacity in this invention is formed between the core of the element consisting of inductances which form half of a condenser and another condenser element consisting of metal plates forming the other half of the condenser.

This invention points out that ohmic resistance of flake metals can be altered by using a flake metal of a pure metal of the electromotive series of either a positive or a negative metal. This invention uses a mixture of positive and negative metals of the electromotive series in a device that acts as a detector of radiant energy.

In this invention the inductances and capacities are placed side by side and the inequalities of the one are neutralized by the other by means of reactance.

Referring to the drawing by figures, Figure 1 represents stator inductances and rotor condenser plates which mesh with the cores of the inductances to form capacity. The inductances are placed bilaterally to the position of the rotor.

Figure 2 is a cross section view of Figure 1 through the spindle of the rotor element cutting the inductances at right angles.

Fig. 3 represents a resistance made suitable for condensers where the condenser elements are spaced apart. The resistance differs from a condenser element in that the conducting metals forming the elements of condensers are joined in metallic circuits while in this resistance the conducting metals are insulated from each other.

Fig. 4 represents a modification of Fig. 1, having a metal core for the inductances instead of the air core of Fig. 1.

Figure 5 represents a cross section view of Fig. 4 cutting the condenser at right angles to the inductances.

Figure 6 represents a combination of Fig. 3 and Fig. 4 in a circuit diagram.

Referring to the drawing by letter in Figure 1, the inductance portion "S" of the bilateral arrangement consists of the stator of the condenser. Coils of insulated electrical wire, the "S" series, are wound on bakelite frames shaped like a U as "D". These "D" frames are held together in spaced relation to each other by studs "C". Cross pieces of metal as "K" join the two outside frames across the ends of the U bakelite frames, which hold the rotor in position and act as the terminal connection of the rotor elements. The inductances are tuned by the condenser plates through reactance.

The rotor consists of the metal spindle "I" to which are fastened the condenser plates "A". These condenser plates rotate within the U frames of the stator overlapping the inductances to form capacity. "F" is a collar for adjusting the spacing distances with the stator elements. "R" is a resistance, one connected to each coil. The coils on the U frames are electrically connected and form sections of one inductance. The condenser elements are spaced apart.

In Figure 2 the cross section view of Figure 1, the lettering is identical with that of Figure 1. Induction takes place between the sectional coils $S_1$, $S_2$, $S_3$ and $S_4$ which are connected either in parallel or in series. When one coil is joined serially with the adjacent coil, so as to form a continuous wire, the voltage is of a higher value than when these same coils are joined in parallel. The invention is not changed by changing the connections of the coils from series to parallel connections. The wires forming the ends of the coils of inductances, if long enough may be connected either in series or in parallel. The elements forming the condenser are separated by spaces between them.

In Figure 3 "M" represents a bonding material also an insulating material for bonding and insulating positive carbon flakes "N" of the electromotive series of the metals with a negative as iron flakes of the electromotive series of metals. A plate structure is necessary for resistance. Its usefulness depends upon the reactance between positive and negative charged elements in a bonding and insulating material. If it were not for the presence of this reactance there would be no detection of radiant energy. Voice modulation in telephony also depends upon this reactance.

Cellulose acetate dope of a non-inflammable variety, shellac or even glue may be used as a bonding material. After the carbon flakes and iron flakes have been incorporated in the mass, the condenser plates may be painted on one side or the inside of the coils may be coated with the insulating compound used as a reactance.

In Figure 4 the coils are marked with the "S" series but the coils of Figure 4 are not the equivalent electrically of the "S" series coils of Figure 1. The "S" coils of Figure 4 plus the "B" plates are the equivalent electrically of the "S" series coils of Figure 1. The stator consists of metal plates "B" held together by studs "C" and spaced parallel and equal distances apart. On each plate is wound a coil of insulated wire to form an inductance. Since there are four plates there are four coils, $S_1$, $S_2$, $S_3$ and $S_4$. One end of the inductance may be connected to a condenser plate as shown in the circuit diagram of Fig. 6, the result being equivalent to a condenser and the inductance joined in series.

In the bilateral arrangement of the positive and negative elements, two pieces of bakelite projecting out at both top and bottom as "D" across the ends of which are connected the rotor end pieces, complete the framework. The rotor spindle passes through end pieces "K" which also act as the terminals for the rotor plates. The rotor consists of metal spindle "I" to which is fastened metal rotor plates "A".

A resistance "R" is connected to the wire of each inductance coil.

Figure 5 is a cross section view of Figure 4, the lettering being the same. The cores of inductances "S" extend beyond the coils. The electrical reactions which take place are the same as in Figure 1 when the coils have one end of the wires fastened to the plates on which they are wound.

Figure 6 is a combination of Figures 3 and 4 showing a circuit diagram for intercepting radio broadcast programs. "Y" represents the antenna. The inductances "S" with resistance "R" in series are connected in parallel with plates on which they are wound. On these plates is a coat of cellulose acetate dope impregnated with positive carbon and negative iron metal flakes exposed beyond the inductances on one side of the plate. If this is not done a plate reactance as in Figure 3 is inserted between the stator plates and the rotor plates.

The rotor plates "A" are connected to the ground "G". Tuning in a broadcast program is done by the usual method of increasing or decreasing the capacity in the circuit by rotating the condenser plates.

The telephone receiver head set "X" has one terminal connected to "A" plates and the other terminal to the "B" plates.

This invention is not limited to the variable types of condenser as described. For instance, instead of having a rotor and stator elements as shown in Figure 4 there may be two sets of stator plates similar to the stator element in Figure 4.

Having described the invention, its applications and usefulness, I claim:

1. A device of the character described, comprising inductance, capacity and resistance, said inductance comprising coils of wire electrically connected together, having a plurality of cores situated adjacent to and in spaced parallel relation to each other; said capacity comprising metal plates forming a rotatably adjustable element, bilaterally disposed with respect to said inductance coils; said resistance being connected electrically to the said inductance and capacity, said inductance coils and said capacity metal plates being spaced apart.

2. A device of the character described, comprising inductance, capacity and resistance, said inductance comprising coils of wire wound on hollow frames, said coils being electrically connected together, having a plurality of cores situated adjacent to and in spaced parallel relation to each other; said capacity comprising metal plates forming a rotatably adjustable element, bilaterally disposed with respect to said inductance coils; said resistance being connected electrically to the said inductance and capacity; said inductance coils and said capacity metal plates being spaced apart.

3. A device of the character described, comprising inductance, capacity and resistance, said inductance comprising coils of wire wound on metal core plates, said plates extending out beyond said coils, said coils being electrically connected together, and said metal cores being situated adjacent to and in spaced parallel relation to each other; said capacity comprising metal plates forming a rotatably adjustable element, bilaterally disposed with respect to said inductance; said resistance being connected electrically to the said inductance and capacity, said inductance and said capacity being spaced apart, said cores of said inductance meshing with the metal plates of said adjustable element.

4. A condenser comprising two electrical elements in spaced parallel relation to each other, each of said elements consisting of a plurality of metal plates electrically connected, one of said elements having a reactance joined to a metal plate and said reactance being spaced apart from other condenser elements, said reactance consisting of flakes of a positive metal of the electromotive series mixed with the flakes of a negative metal of the electromotive series, said flakes held in a bond of insulating material.

5. A condenser comprising two electrical elements in spaced parallel relation to each other, each of said elements consisting of a plurality of metal plates electrically connected, each of said metal plates having coils of insulated wire electrically connected and wound on half of the width of said plates, the other half of said metal plates forming a capacity; one of said elements having a reactance joined to a condenser plate element and said reactance being spaced apart from other of said condenser elements, said reactance consisting of flakes of a positive metal of the electromotive series mixed with the flakes of a negative metal of the electromotive series, said flakes held in a bond of insulating material.

6. A condenser comprising two electrical elements in spaced parallel relation to each other, each of said elements consisting of a plurality of metal plates electrically connected, one of said elements having a reactance joined to a condenser plate element and said reactance being spaced apart from other of said condenser elements, said reactance consisting of flakes of carbon mixed with iron flakes, said flakes held in a bond of bakelite.

JOHN J. AURYNGER.